(12) United States Patent
Malfatti et al.

(10) Patent No.: US 10,543,878 B2
(45) Date of Patent: Jan. 28, 2020

(54) SEAT FOR A VEHICLE (71) Applicant: Selle Royal S.p.A., Pozzoleone (Vicenza) (IT)

(72) Inventors: Marco Malfatti, Pozzoleone (IT); Barbara Bigolin, Pozzoleone (IT)

(73) Assignee: SELLE ROYAL S.P.A., Pozzoleone (Vicenza) (IT)

(*) Notice: Subject to any disclaimer, the term of this patent is extended or adjusted under 35 U.S.C. 154(b) by 3 days.

(21) Appl. No.: 16/073,081

(22) PCT Filed: Feb. 10, 2017

(86) PCT No.: PCT/IB2017/050747
§ 371 (c)(1),
(2) Date: Jul. 26, 2018

(87) PCT Pub. No.: WO2017/137944
PCT Pub. Date: Aug. 17, 2017

(65) Prior Publication Data
US 2019/0023338 A1    Jan. 24, 2019

(30) Foreign Application Priority Data
Feb. 11, 2016   (IT) .............. MI2016A4239

(51) Int. Cl.
B60N 2/40    (2006.01)
B62J 1/00    (2006.01)
B62J 1/20    (2006.01)
B62H 5/00    (2006.01)

(52) U.S. Cl.
CPC ............. *B62J 1/20* (2013.01); *B62H 5/001* (2013.01)

(58) Field of Classification Search
CPC ......... B62J 1/20; B62J 1/08; B62J 1/18; B62J 1/007; B62J 1/005; B62J 1/00; B62J 1/002; B62J 1/02; B62H 5/006; Y10T 70/5872
See application file for complete search history.

(56) References Cited

U.S. PATENT DOCUMENTS

| | | | | |
|---|---|---|---|---|
| 7,367,619 B2* | 5/2008 | Fregonese | ............ | B62J 1/00 297/195.1 |
| 7,581,787 B2* | 9/2009 | Livne | ............ | B62H 5/00 297/201 |
| 7,611,194 B2* | 11/2009 | Segato | ............ | B62J 1/02 297/195.1 |
| 7,625,041 B2* | 12/2009 | Bigolin | ............ | B62J 1/08 297/188.08 |
| 8,939,000 B2* | 1/2015 | Mendyk | ............ | B62H 5/006 297/195.1 |
| 10,370,051 B2* | 8/2019 | Staples | ............ | B62J 1/08 |

(Continued)

FOREIGN PATENT DOCUMENTS

| | | |
|---|---|---|
| TW | 201341245 | 10/2013 |
| WO | 2015059624 | 4/2015 |
| WO | 2015193785 | 12/2015 |

OTHER PUBLICATIONS

International Search Report for PCT/IB2017/050747 dated May 19, 2017 (2 pages).

*Primary Examiner* — Shin H Kim
(74) *Attorney, Agent, or Firm* — Tutunjian & Bitetto, P.C.

(57) ABSTRACT

The present invention regards a seat for a vehicle, a bicycle, a stationary bicycle or a motorcycle including a base group, a top group and removable engagement means between base group and top group.

18 Claims, 7 Drawing Sheets (56) References Cited

U.S. PATENT DOCUMENTS

| | | | | |
|---|---|---|---|---|
| 2011/0291446 | A1* | 12/2011 | Bourgeois | B62J 1/08 |
| | | | | 297/195.1 |
| 2013/0134748 | A1* | 5/2013 | Moravcik | B62J 1/002 |
| | | | | 297/214 |
| 2015/0130234 | A1* | 5/2015 | Bailie | B62J 1/18 |
| | | | | 297/214 |
| 2016/0176082 | A1* | 6/2016 | Bigolin | B29C 43/04 |
| | | | | 297/215.16 |
| 2017/0183049 | A1* | 6/2017 | Hight | B62J 1/08 |
| 2017/0217521 | A1* | 8/2017 | Li | B62J 1/08 |
| 2017/0313373 | A1* | 11/2017 | Bigolin | B62J 1/00 |
| 2018/0050750 | A1* | 2/2018 | Marui | B62J 1/08 |
| 2018/0111653 | A1* | 4/2018 | Checchin | B62J 1/08 |
| 2018/0304948 | A1* | 10/2018 | Hsu | B62J 1/005 |
| 2019/0023338 | A1* | 1/2019 | Malfatti | B62J 1/20 |
| 2019/0118886 | A1* | 4/2019 | Bigolin | B62J 1/00 |
| 2019/0144061 | A1* | 5/2019 | Staples | B62J 1/08 |
| | | | | 297/215.15 |

* cited by examiner

SEAT FOR A VEHICLE

TECHNICAL FIELD OF THE INVENTION

The present invention regards a new seat for a vehicle, such as a bicycle, a stationary bicycle or a motorcycle, as well as a method for disassembling a seat or better yet a top group with respect to a base group thereof.

DESCRIPTION OF RELATED ART

Many seats for vehicles have been proposed, which usually comprise felt and a padding connected together, as well as a fork constrained below the group formed by felt plus padding and constrainable to the seat post tube by means of apposite locking jaws.

The international application No. PCT/IB2014/065476 on behalf of the applicant of the present patent application teaches a seat with a padding component, a base component as well as removable constraining means therebetween which include a key component mounted in an anchorage opening made in the base component as well as a tang in the padding component intended to be removably engaged with the key.

If on one hand such solution is reliable and effective, it nevertheless involves the arrangement of a padding component and a base component having a complex configuration, whose attainment requires a series of expedients.

SUMMARY OF THE INVENTION

One object of the present invention is to provide a new seat for vehicles, in particular for bicycles, motorcycles or stationary bicycles.

Another object of the present invention is to provide a new seat which can be easily and quickly disassembled or dismounted, at the padding.

Another object of the present invention is to provide a new seat which has components that are simple and inexpensive to make.

In accordance with one aspect of the invention, a seat is provided according to the present application.

In accordance with another aspect of the invention, a method is provided according to the present application.

The present application refers to preferred and advantageous embodiments of the invention.

BRIEF DESCRIPTION OF THE DRAWINGS

Other characteristics and advantages of the invention will be more evident from the description of one embodiment of a seat, illustrated as an example in the set of drawings, wherein.

In the set of drawings, equivalent parts or components are marked with the same reference numbers.

DETAILED DESCRIPTION OF THE INVENTION

Figure 1:
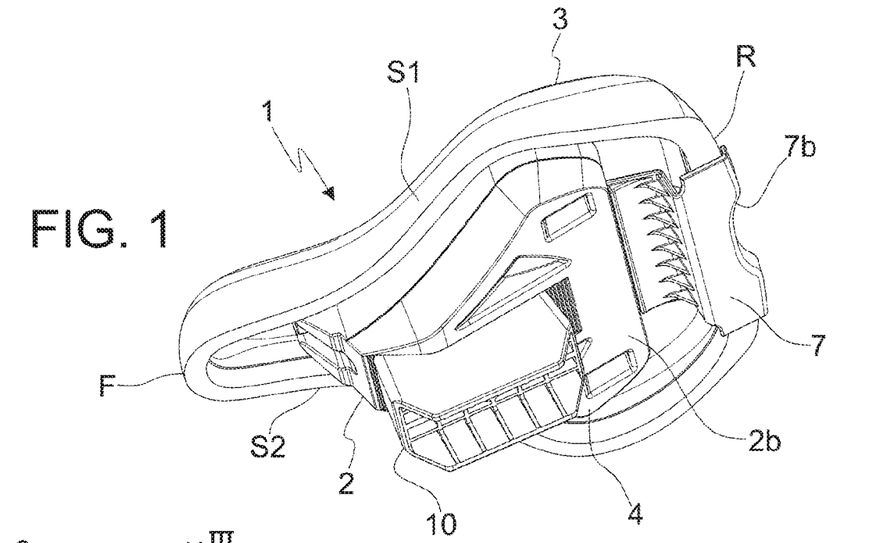
FIG. 1 is a slightly top perspective view of a seat according to the present invention.
Figure 2:
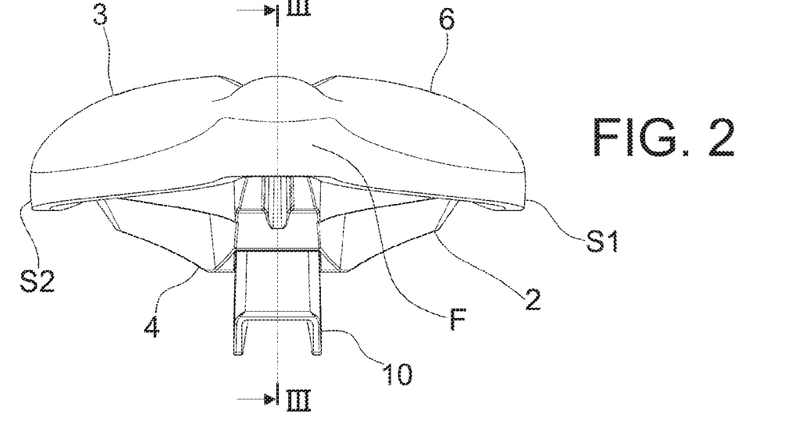
FIG. 2 is a front view of the seat of FIG. 1.
Figure 3:
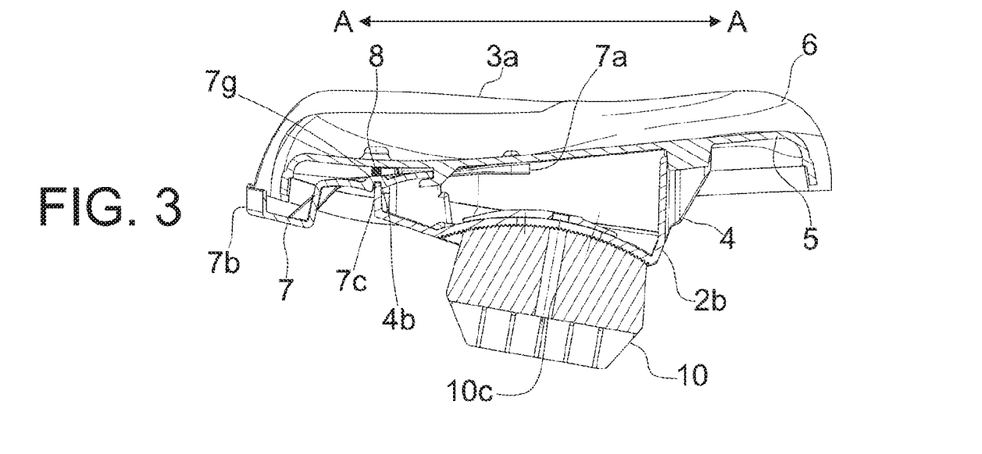
FIG. 3 is a section view along the trace of FIG. 2.
Figures 4, 5:
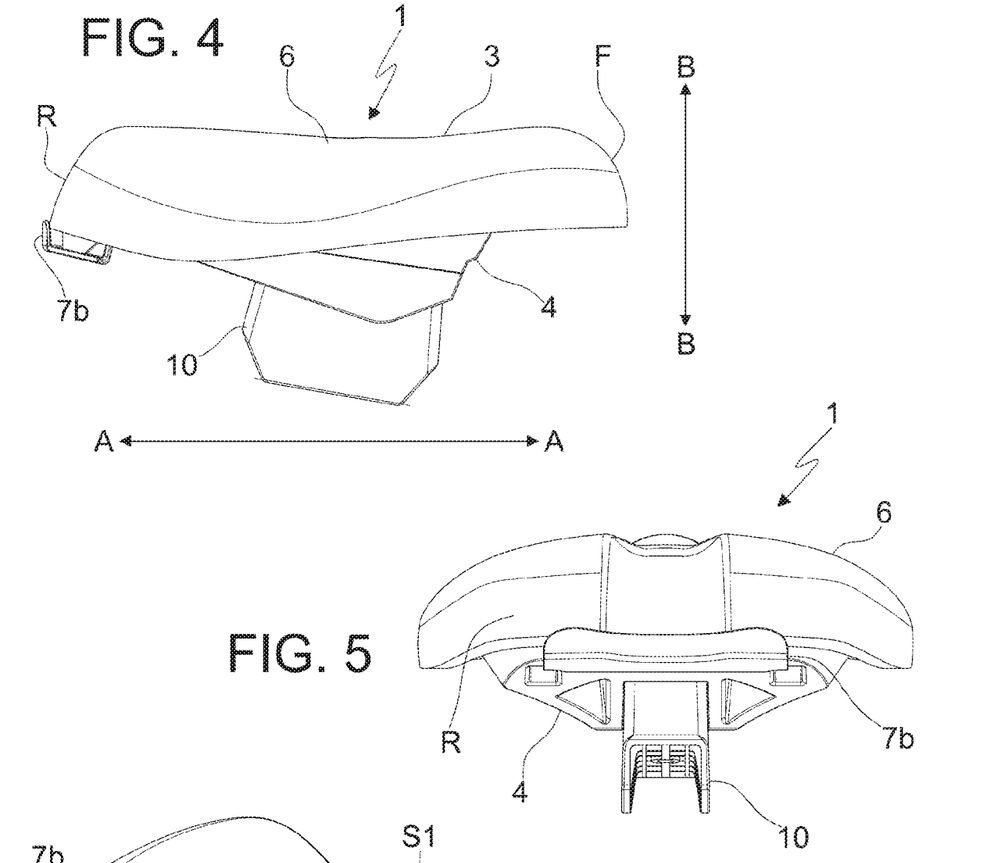
FIGS. 4 to 6 are views, respectively side, rear and top of the seat of FIG. 1.
Figure 6:
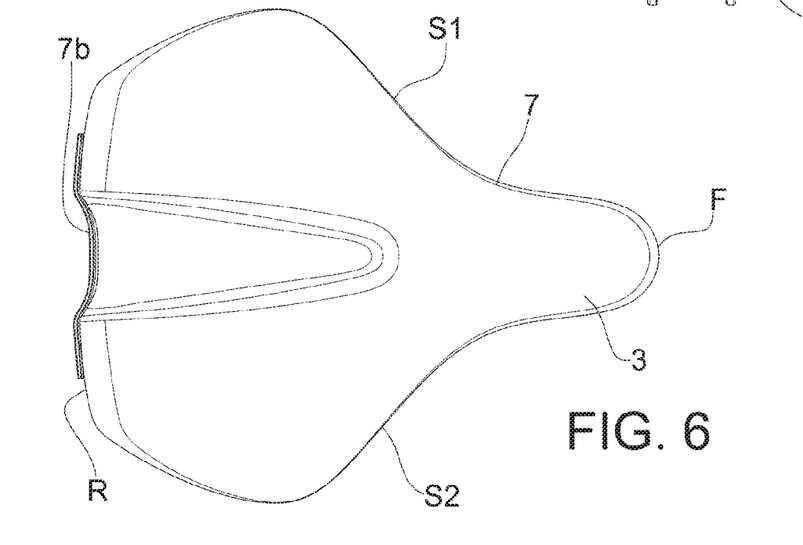
Figure 7:
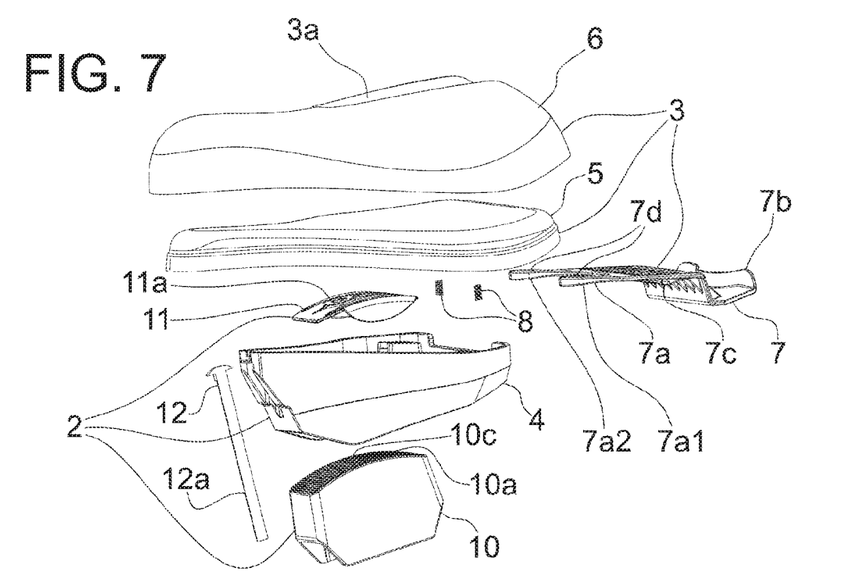
FIG. 7 is an exploded view of the seat of FIG. 1.
Figures 8, 10, 11:
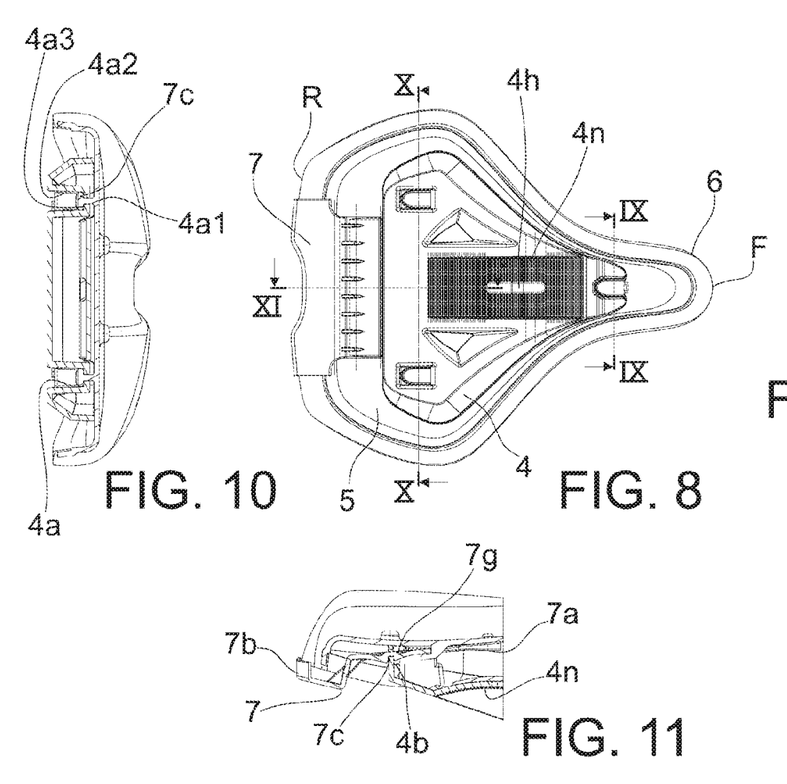
FIG. 8 is a bottom view of a seat of FIG. 1 without support component.
FIG. 10 is a section view along the trace X-X of FIG. 8.
FIG. 11 is a section view along the trace XI-XI of FIG. 8.
Figure 9:
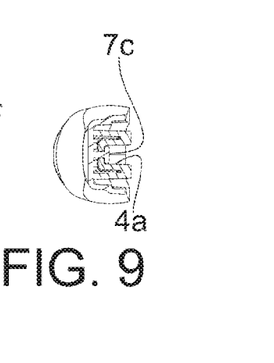
FIG. 9 is a section view along the trace IX-IX of FIG. 8.
Figure 12:
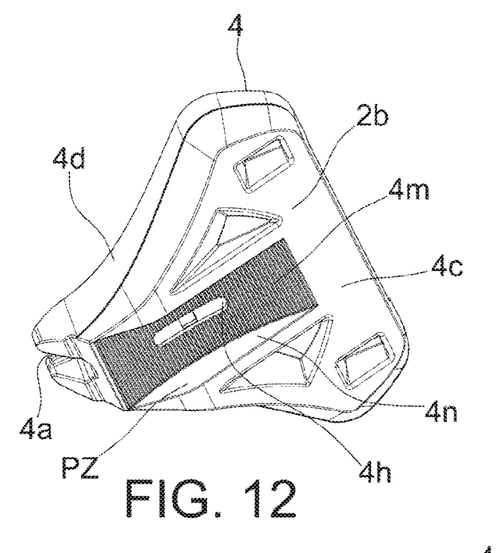
FIGS. 12 and 13 are perspective views, respectively slightly bottom and slightly top of a lower shell with a mask component of a seat according to the present invention.
Figure 13:
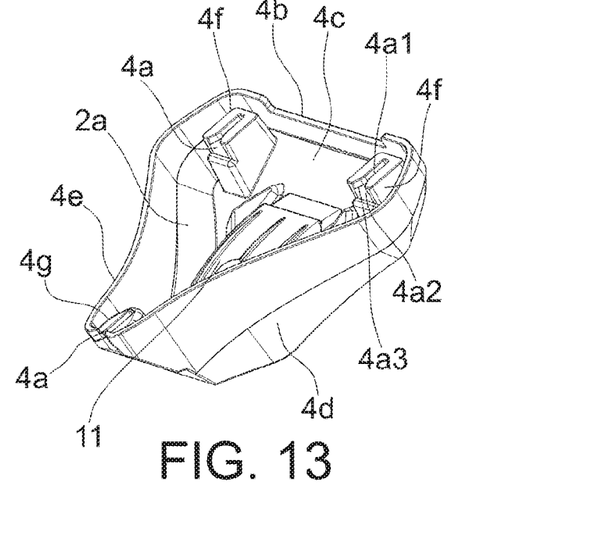
Figure 14:
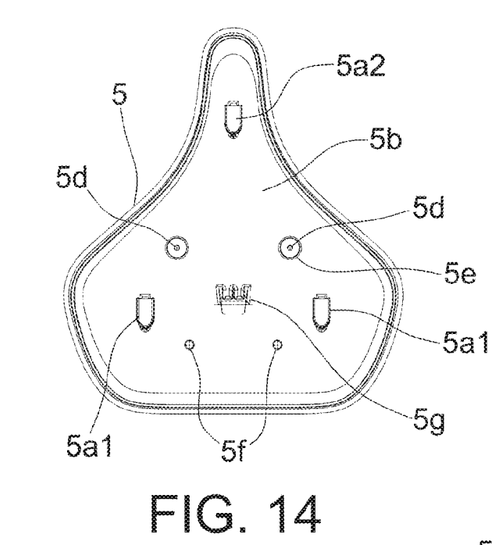
FIGS. 14 and 15 are views, respectively, bottom and perspective slightly bottom of an upper shell of the seat of FIG. 1.
Figure 15:
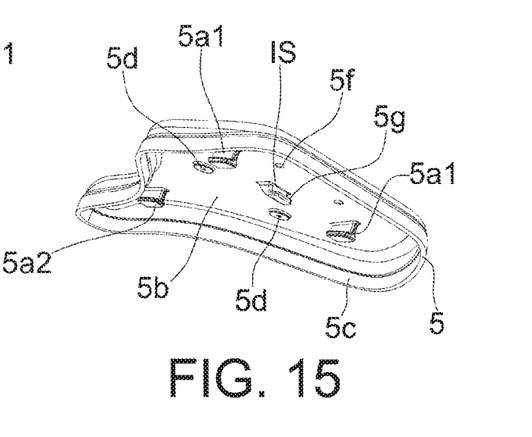
Figure 16:
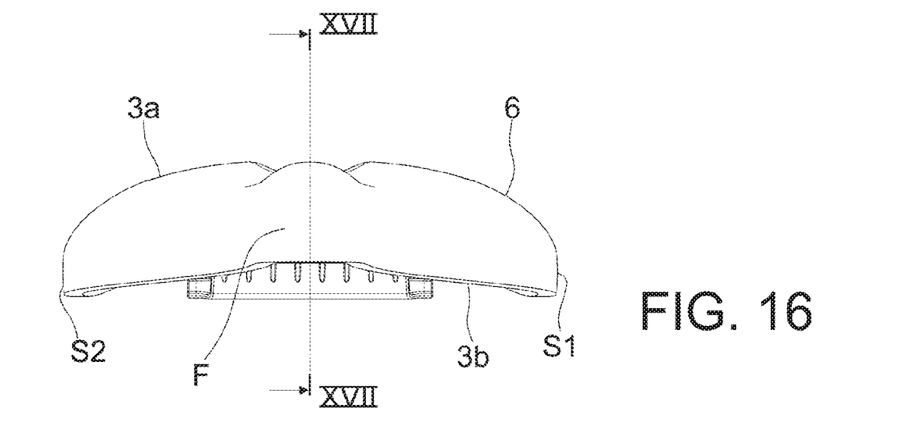
FIG. 16 is a front view of a top group of the seat of FIG. 1.
Figure 17:
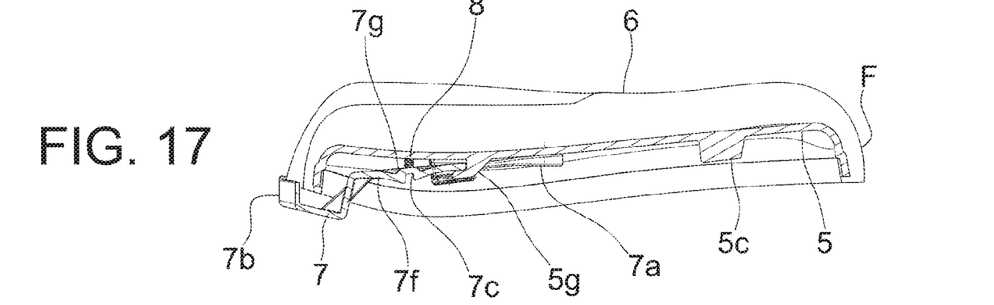
FIG. 17 is a section view along the trace XVII-XVII of FIG. 16.
Figure 18:
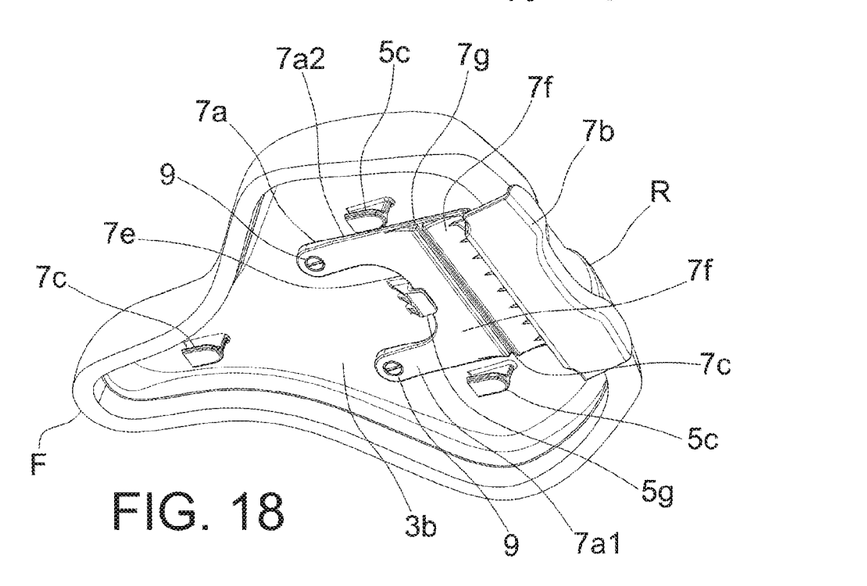
FIG. 18 is a slightly bottom perspective view of the group of FIG. 16.
Figure 19:
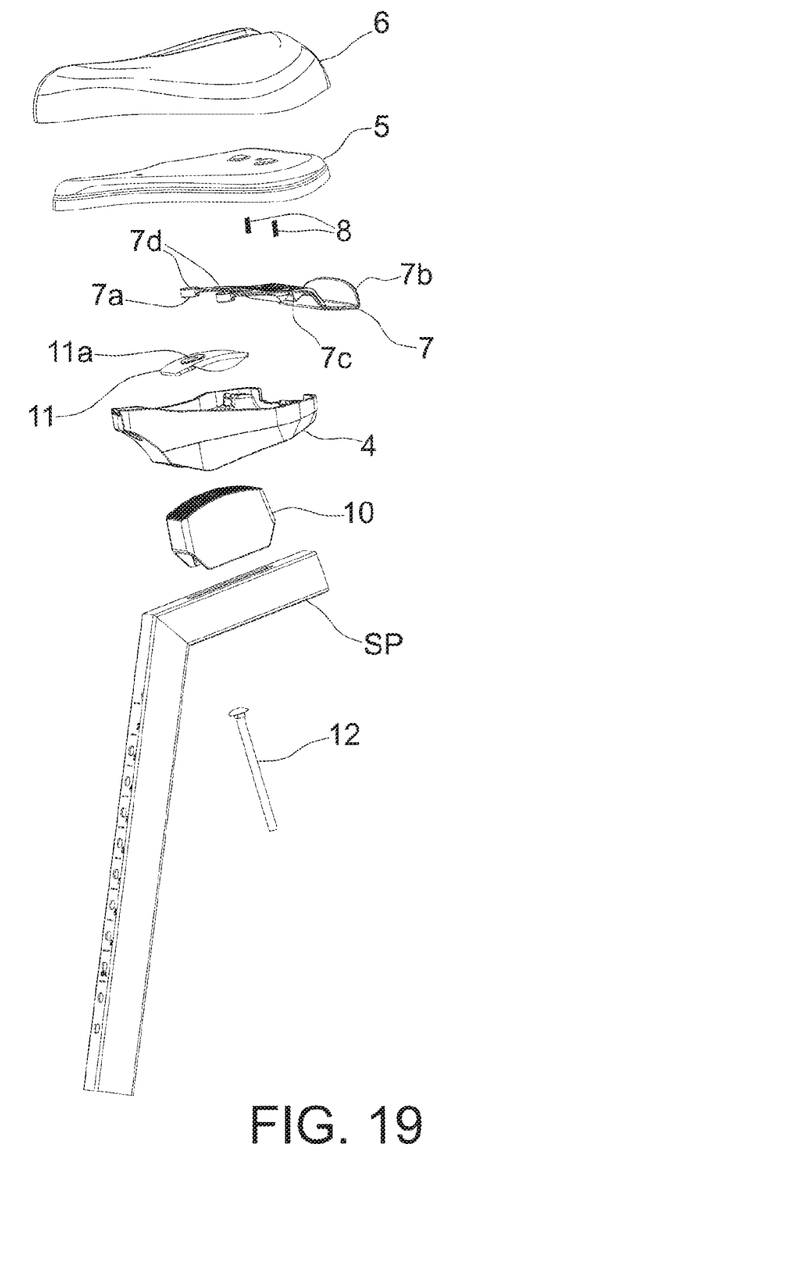
FIG. 19 is an exploded view of the seat of FIG. 1 with a seat post tube.
Figures 20, 21, 22:
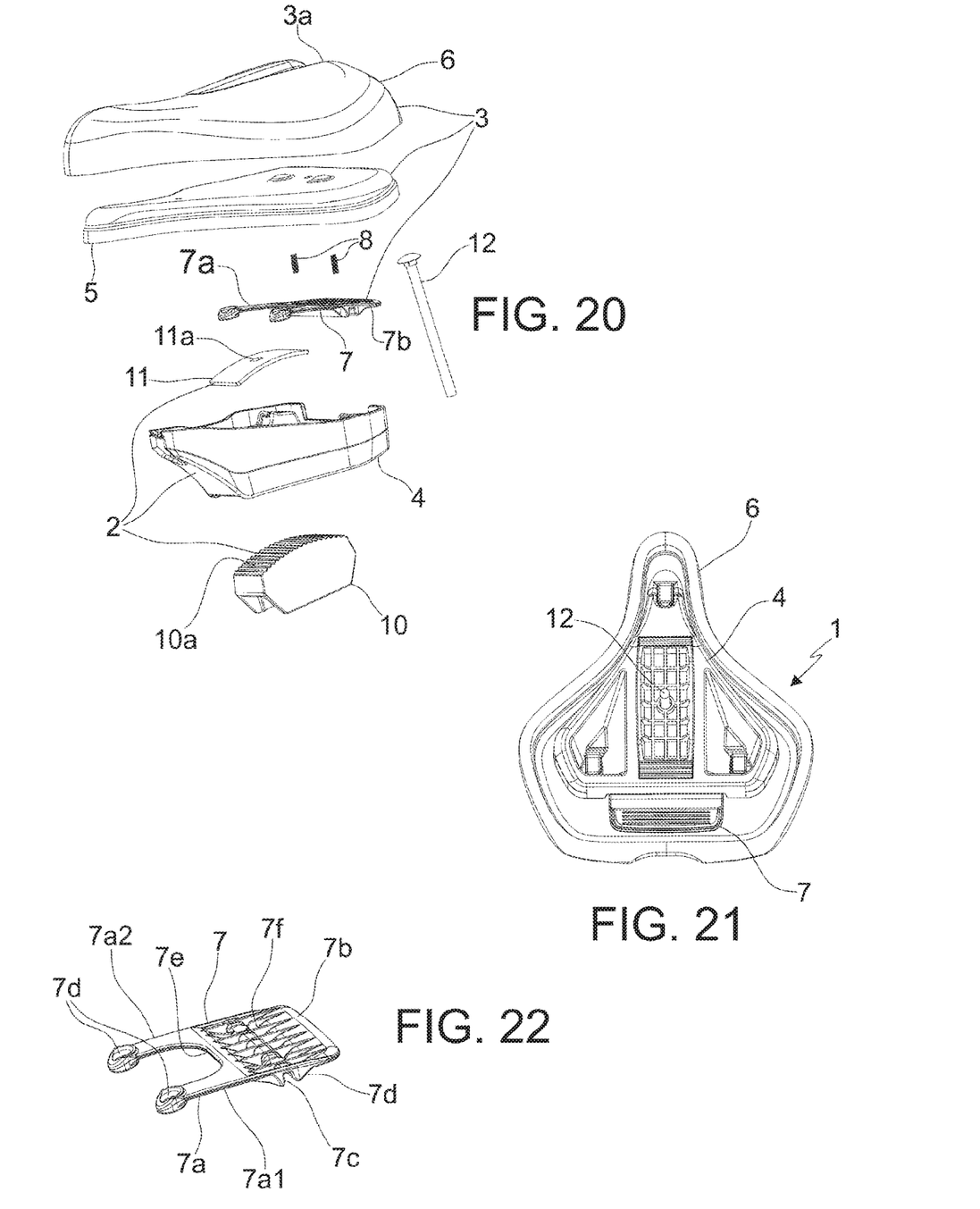
FIG. 20 is an exploded view of another embodiment of a seat according to the present invention.
FIG. 21 is a bottom view of the seat of FIG. 20.
FIG. 22 is a slightly top perspective view of the lever of the seat of FIG. 20.

With reference to FIGS. 1 to 22, a seat 1 is illustrated for a vehicle, a bicycle, a stationary bicycle or a motorcycle comprising a base group 2 which can be fixed to a tube or support element or seat post SP (FIG. 19) of a vehicle, a bicycle, a stationary bicycle or a motorcycle, and such base group 2 has an upper surface or area 2a (FIG. 13) as well as a lower surface or area 2b.

The seat then also includes a top group 3 having an upper face or zone 3a as well as a lower face or zone 3b, in use, resting on or facing toward the upper surface or area 2a of the base group 2. The upper face 3a of the top group 3 defines a supporting surface for a user.

The base group 2 according to the non-limiting embodiment illustrated in the figures includes a lower shell 4.

The top group 3 can instead comprise an upper shell 5 as well as, if desired, a padding component 6 constrained to the upper shell 5, for example glued or molded thereon.

The base group 2 and/or the top group 3 can also comprise a releasing mechanism, such as at least one lever or handle 7 having a constraining or fixing end or portion 7a constrained/constrainable or fixed/fixable to the lower shell 4 or to the upper shell 5 and having, in use, a grip end 7b engageable starting from an edge portion of the seat 1 or projecting at an edge portion of the seat 1; such grip end 7b is not fixed to the shell 4, 5 to which the constraining end 7a is constrained, nor clearly, to the other shell. According to the preferred embodiment illustrated in the figures, the lever has one end 7a secured or fixed to the upper shell 5.

If the lever 7 is secured or fixed to the upper shell, then the seat can also include at least one elastic loading element 8 of the lever 7 with respect to the upper shell 5, the at least one elastic loading element 8 being designed to maintain the lever 7 yieldingly spaced from the lower face of the upper shell 5. Alternatively, if the lever 7 is secured or fixed to the lower shell 4, then the elastic loading element 8 is designed to maintain the lever 7 yieldingly spaced from the upper face of the lower shell 4.

A seat 1 according to the present invention is then provided with removable engagement means between base group 2 and top group 3, and such removable engagement means comprise first removable engagement means intended to prevent or hinder the relative displacement of the base group 2 and of the top group 3 in a first direction A-A lying, in use, on a horizontal or vertical plane, while the first removable engagement means are disengageable or releasable by moving the lever 7 with respect to the lower shell 4 and/or to the upper shell 5 in a second direction B-B transversal or orthogonal to the first direction. More particularly, if the lever 7 is secured or fixed to the lower shell 4 then the first removable engagement means are disengageable or releasable by moving the lever 7 with respect to the upper shell 5 and if desired also in part with respect to the lower shell 4, while if the lever 7 is secured or fixed to the upper shell 5 then the first removable engagement means are disengageable or releasable by moving the lever 7 with respect to the lower shell 4 and if desired also in part with respect to the upper shell 5.

According to the non-limiting embodiment illustrated in the figures, the first removable engagement means are disengageable or releasable by relatively moving the lever on the rear of the top group 3 with respect to a portion on the rear of the base group 2, but it will be understood that solutions could be provided in which a lever is relatively moved on the front or on the sides of the groups 2, 3, or a combination of such solutions could be provided.

Advantageously, the first removable engagement means are intended to prevent or hinder the displacement of the lever 7 with respect to the lower shell 4 (if the lever 7 is secured or fixed to the lower shell 4) or to the upper shell 5 (if the lever 7 is secured or fixed to the upper shell 5) in a sliding direction A-A or first direction lying, in use, on a horizontal plane. Still more advantageously, the first removable engagement means are disengageable or releasable by raising (second direction B-B) a lever 7 with respect to the base group 2 or better yet to the lower shell 4 (if such lever is secured or fixed to the upper shell) and/or lowering (second direction B-B) a lever 7 with respect to the top group 3 (if such lever is secured or fixed to the lower shell).

In addition, if the lever or a lever 7 is secured or fixed to the upper shell 5, then the raising of the lever 7 in order to disengage or release the first removable engagement means also involves or can involve a pressing of the lever 7 against a portion, for example on the rear, on the front and/or on the sides, of the upper shell 5, if desired against the action of one or more elastic loading elements 8, while in the case in which the lever or a lever 7 is secured or fixed to the lower shell 4, then the lowering of the lever 7 in order to disengage or release the first removable engagement means also involves or can involve a pressing of the lever 7 against a portion, e.g. on the rear, on the front and/or on the sides, of the lower shell 4, if desired against the action of one or more elastic loading elements 8.

Preferably, the engagement means also comprise second removable engagement means intended to prevent or hinder the displacement of the top group 3 with respect to the base group 2 in the second direction; the second removable engagement means are disengageable or releasable by moving the top group 3 with respect to the base group 2 in the first direction.

Advantageously, the second removable engagement means are intended to prevent or hinder the relative lowering-lifting (second direction) of the base group 2 and of the top group 3, while they (second removable engagement means) are disengageable or releasable by moving the top group 3 with respect to the base group 2 in the sliding direction A-A or first direction.

More particularly, the seat has a front F, a rear R, two sides S1, S2, a bottom surface 2*b* corresponding to the lower surface of the base group 2, while the sliding direction A-A is a direction from the front F to the rear R, i.e. parallel to a main longitudinal axis or length of the seat, or a direction from one side S1 to the other S2, i.e. parallel to a main transverse axis or width of the seat, or a direction inclined with respect to such directions (F-R and S1-S2).

Alternatively, both the first direction and the second direction could be directions lying in a horizontal plane, for example with the first direction from the front F to the rear and a second direction from one side S1 to the other S2 or vice versa.

Advantageously, the second removable engagement means are releasable or disconnectable when the first engagement means are released or disconnected or better yet after the first engagement means have been released or disconnected, so that for releasing the top group 3 with respect to the base group 2 firstly the displacement of the lever 7 is controlled with respect to the lower shell 4 and/or to the upper shell 5 along the second direction B-B, e.g. raising the lever 7 with respect to the base group 2, if desired with pressing of the lever against the upper shell 5, and/or lowering the lever with respect to the top group 3, if desired with pressing of the lever against lower shell 4, thus releasing the first removable engagement means, and then the displacement of the top group 3 with respect to the base group 2 along the first direction A-A is controlled, thus releasing the second removable engagement means.

If desired, the second removable engagement means comprise at least one housing portion 4*a* of the top group 3 or of the base group 2 as well as at least one sliding section 5*a*1, 5*a*2 of the other between base group 2 or top group 3 slidably engageable along the sliding direction A-A in a respective housing portion 4*a*. Preferably, each sliding section is configured in a manner substantially complementary to the housing portion so that, when the sliding sections are engaged with the respective housing portions, the displacement along the second direction B-B of the top group with respect to the base group 2 is prevented or hindered.

According to the embodiment illustrated in the figures, the first removable engagement means comprise at least one lowered or protruding portion 4*b* of the lower shell 4 or upper shell 5 intended to engage the projecting or recessed section 7*c*, so that by moving the lever 7 along the second direction B-B with respect to the lower shell 4 or upper shell 5 including the lowered or protruding portion, for example by raising the lever 7 of the top group 3, if desired maintaining the upper shell 5 stopped or raising it together with the upper shell 5 or better yet with a portion of the upper shell 5, for example on the rear (according to the non-limiting embodiment illustrated in the figures), on the front and/or on the sides of the same shell 5, with respect to the base group 2 and/or lowering the lever 7 of the base group 2 (if desired maintaining the lower shell 4 stopped or lowering it together with the lower shell 4 or better yet with a portion of the lower shell 4, for example placed on the rear, on the front and/or on the sides), with respect to the upper shell 5, the projecting or recessed section 7*c* is disengaged or released from the lowered or protruding portion 4*b*.

With reference to the configuration of the components of the seat of the non-limiting embodiment illustrated in the figures, the lower shell 4 can comprise a semi-shell element, if desired with substantially triangular configuration, with a base wall 4*c* and a lateral wall 4*d* protruding from the perimeter of the base wall 4*c* and defining at the top an upper edge 4*e*, a section of which, for example rear, in use, can constitute a protruding portion 4*b* of the base group 2. More particularly, the protruding portion 4*b* can constitute a lowered section of the upper edge 4*e*.

Starting from the internal face, in use, of the base wall 4c and within or at an edge of the zone defined thereby with the lateral wall 4d, one or more block or box components 4f, 4g can also extend, if desired each defining a housing portion 4a or a respective sliding section 5a1, 5a2. More particularly, each block or box component 4f, 4g delimits an upper slit 4a, if desired open towards the front F and closed towards the rear R, which has, from top to bottom, a section with lower width 4a1 and then a section with greater width 4a2 with the delimitation of two shoulders 4a3, in use, directed downward, so that the slit has a substantially overturned T-shaped configuration. With reference to the specific embodiment illustrated in the figures, two rear block or box components 4f are provided, formed at the rear of the lower shell 4 and within the zone defined by the base wall 4c with the lateral wall 4d as well as spaced from the protruding section 4b of the upper edge 4e, as well as a front block or box component 4g formed at the front or at the tip of the lower shell 4 and, preferably, delimiting a slit 4a leading outside the shell 4.

In addition, the base wall 4c can delimit a through slot 4h which extends in front F-rear R direction, and the lower face of the same wall 4c can have a toothed curved section 4m extended around the through slot 4h, whose teeth have, for example, main extension transversal or orthogonal to the front F-rear R direction. In addition, the toothed section 4m can be formed on a lowered portion of the base wall 4c, so that the toothed section 4m is flanked by two sections 4n of the wall 4c that are transversal or orthogonal to the toothed section 4m and defining a positioning zone PZ therewith, which will be discussed hereinbelow.

With regard instead to the upper shell 5, this has a main wall 5b, if desired with triangular configuration, as well as an edge wall 5c protruding downward, in use, starting from the main wall 5b. Starting from the lower face, in use, of the main wall 5b, one or more sliding sections 5a1, 5a2 extend, if desired T-shaped sections each intended to slidably engage a respective housing portion 4a or one or more housing portions intended to slidably engage a sliding section of the base group or of the lower shell 4. The sliding sections 5a1, 5a2 can be engaged with the housing portions 4a for sliding in front F-rear R direction or from one side S1 to the other S2 of the upper shell 5 with respect to the lower shell 4, but once engaged they substantially prevent the moving away in vertical direction, i.e. the lowering-lifting of the upper shell 5 with respect to the lower shell 4 and this can for example be obtained by means of the engagement of the T-shaped end of the sections 5a1, 5a2 with the upper slit 4a configured as an overturned T. Naturally, this can also be obtained with other configurations, if desired also forming the housing portion(s) in the upper shell 5 and the sliding section(s) in the lower shell 4.

More particularly, the sliding sections 5a1, 5a2 are at a relative distance corresponding to the distance between the block or box components 4f, 4g.

With reference to the specific embodiment illustrated in the figures, two rear T-shaped sections 5a1 are provided, formed at the rear of the upper shell 5 and within the zone defined by the main wall 5b with the edge wall 5c, which are intended to slidably engage the two rear block or box components 4f in the direction A-A, along with a front T-shaped section 5a2 formed at the front or at the tip of the upper shell 5 and intended to slidably engage the front block or box component 4g in the direction A-A.

The upper shell 5 can then have first constraining means, for example it can delimit one or more (two according to the embodiment in the figures) first holes 5d, if desired surrounded by a section in relief, e.g. toothed or serrated 5e as well as, if desired, one or more (two according to the embodiment in the figures) second constraining means, e.g. second holes 5f, for example in rear position with respect to the first holes 5d.

The upper shells can then have a bracket component or abutment component 5g delimiting an insertion seat IS facing toward the rear R of the seat 1, and such bracket component 5g can be arranged between the two rear sliding sections 5a1.

Additionally, the upper shell 5 has greater width than the lower shell 4, i.e. the edge wall 5c delimits a zone of greater width and such to contain or surround, in use, the lower shell 4 or better yet an upper part thereof.

With regard instead to the lever 7, the respective constraining end or portion 7a can be secured or fixed to the lower shell 4 or to the upper shell 5 by means of third constraining means, e.g. screws 9 or rivets or glue or fitting means, for the engagement with the first constraining means 5d; for such purpose, the constraining or fixing end 7a can be configured as a fork with the prongs 7a1, 7a2 having third constraining means or delimiting third holes 7d alignable with the first holes 5d for the insertion of screws 9 in such aligned holes 5d, 7d.

If desired, if the upper shells has a bracket component 5g, then the length of the prongs 7a1, 7a2 is equal to the distance (along a front F-rear R direction) between the bracket component 5g and the first constraining means or the first holes 5d, so that in use, by bringing the prongs 7a1, 7a2 with the third constraining means 7d to the first constraining means 5d, if desired by bringing the third holes 7d in alignment with the first holes 5d, the cradle zone 7e of the lever 7 delimited between the prongs 7a1, 7a2 abuts against the bracket component 5g and substantially within the insertion seat IS.

With reference to the grip end 7b of the lever 7, this can be substantially C-shaped and delimit a concave zone directed upward (according to the embodiment illustrated in the figures) or downward, in use, which is designed to project from or surround a portion of the lower shell 4 or upper shell 5, to which a rear edge portion of the shell 4, 5 is constrained or fixed if desired.

Alternatively, the grip end 7b might not project outward (see in particular FIGS. 20 to 22) at an edge portion of the seat 1 and, if desired, it can be substantially straight or not C-shaped; in such case, the grip end 7b would in any case be engageable at an edge portion of the seat 1 or better yet starting therefrom, for example by arranging one hand under the seat 1 or better yet under the upper shell 5, thus reaching the grip end 7b and hence being able to actuate the releasing mechanism 7. According to the non-limiting embodiment illustrated in the figures, the lever 7 is engageable starting from the rear of the seat and the grip end 7b thereof projects towards the rear with respect to the lower shell 4, but not with respect to the upper shell 5, i.e. the grip end 7b does not project beyond the plan or horizontal size of the upper shell 5, but it does project beyond the plan or horizontal size of the lower shell 4. Naturally, the grip end 7b could also project towards the front or towards the flanks or sides with respect to the lower shell 4.

According to the non-limiting embodiment illustrated in the figures, the lever 7 also includes an intermediate portion 7f between the constraining end 7a and the grip end 7b, and such intermediate portion 7f can be substantially flat.

In such case, the first engagement means can comprise a recessed section 7c open downward (according to the embodiment in the figures) or upward and, if desired, delimited by the intermediate portion 7f of the lever 7, for example by an enlarged section 7g of the intermediate portion 7f. The recessed section 7c for example extends in the direction from one side S1 to the other S2.

In use, if the lever 7 is constrained to the upper shell 5, then a lowered or protruding portion 4b of the base group 2, for example a rear section 4b, in use, of the upper edge 4e of the lower shell 4 is intended to be inserted, substantially to size, within the projecting or recessed section 7c, in a manner such that by raising the lever 7 with respect to the base group 2, the recessed section 7c is raised, disengaging it with respect to the protruding portion 4b. Alternatively, a lowered or protruding portion of the top group is intended to be inserted, substantially to size, within the projecting or recessed section of a lever constrained to the lower shell 4.

Advantageously, as indicated above, the seat can also include at least one elastic loading element 8 of the lever 7 with respect to the upper shell 5 or lower shell 4 to which it is constrained. The elastic loading element 8 can comprise one or a pair of springs 8, if desired helical, constrained, e.g. engaged, on one side with the upper shell 5 or lower shell 4 and on the other side with the lever 7, more particularly with the upper or lower face, in use, of the intermediate portion 7f; additionally, the spring or the springs 8 are preferably constrained to the lever 7 at the recessed section 7c or at the enlarged section 7g, if desired with longitudinal symmetry axis substantially aligned with the recessed section 7c. The springs are then constrained to the lower shell 4 or upper shell 5 by means of suitable constraining means, for example by means of the second constraining means; with reference to such aspect, if the second constraining means include one or more second holes 5f, then the elastic loading elements 8 are inserted in such holes 5f.

As indicated above, the elastic loading element(s) 8 are designed to maintain the lever 7 yieldingly spaced from the lower face of the upper shell 5 or from the upper face of the lower shell 4, in a manner such that by grasping the base group 2 or the top group 3 it is possible to press the lever 7 towards the lower face of the upper shell 5 or the upper face of the lower shell 4, hence causing the disengagement of the protruding portion 4b from the curved section 7c.

The elastic loading elements 8 are thus movable between a first rest or extended position, in which they maintain the lever 7 or better yet the grip end 7b and, if provided, the intermediate portion 7f at a distance from the lower face of the upper shell 5 or from the upper face of the lower shell 4 and a work or loading position, in which the grip end 7b and, if provided, the intermediate portion 7f are substantially pressed against the lower face of the upper shell 5 or the upper face of the lower shell 4 by disengaging the lever 7 from the other shell 4, 5.

As will be understood, the seat could have only first engagement means, hence without the second engagement means; for such purpose, the seat could for example have multiple levers, for example two at the sides, or one lever such to cover and project from the rear and in part from the sides of the seat.

If desired, the base group 2 also comprises adjusting means for adjusting the seat's inclination with respect to a seat post tube SP or to a support element of a vehicle, such as a bicycle, a motorcycle or a stationary bicycle, and such adjusting means can include a support component 10, if desired box-like and having an upper wall, if desired curved and substantially complementary to the base wall 4c; additionally, the upper wall can have a second toothed section 10a with teeth at a distance corresponding to the distance between the teeth of the toothed curved section 4m, so that it is possible to engage the toothed curved section 4m and the second toothed section 10a in a plurality of positions. In the support component 10, a fourth through hole 10c is then formed, leading to the second toothed section 10a.

The support component 10 comprises a hollow body defining an opening open downward so as to allow the mounting on a seat post tube SP or on a support element of a vehicle, such as a bicycle, a motorcycle or a stationary bicycle. Additionally, the support component 10 has width smaller than the distance between the two transversal or orthogonal sections 4n, such that it can be inserted therebetween or better yet in the positioning zone PZ until the second toothed section 10a is brought into engagement with the toothed curved section 4m and the fourth through hole 10c directed and open towards the through slot 4h.

The adjusting means then comprise a mask component 11 delimiting a fifth through hole 11a and if desired substantially curved, and such mask component 11, in use, is placed between lower shell 4 and upper shell 5 in abutment against the upper face of the base wall 4c, with the fifth through hole 11a in substantial alignment with the through slot 4h and with the fourth through hole 10c.

The adjusting means then comprise a rod 12 if desired having an externally threaded section, insertable in the through holes 11a and 10c and in the slot 4h aligned and fixable in a seat post tube SP or in/with a support element of a vehicle, such as a bicycle, a motorcycle or a stationary bicycle. More particularly, the rod 12 has a stem 12a with width smaller than the section of the through holes 11a and 10c and an enlarged head with width greater than such section and intended to be abutted against the upper face, in use, of the mask component 11.

As will be understood, in order to vary the inclination of the seat, it is sufficient to release the rod 12 from the tube SP or from the support element, slightly move the lower shell 4 away from the support component 10, angularly move base group 2 (without support component 10) and top group 3 as desired with respect to the support component 10 and then once again tighten the rod 12 to the tube or to the support element, so as to cause the engagement between the toothed curved section 4m and the second toothed section 10a and hence the locking in position of the base group 2 and of the top group 3.

A method for disassembling a top group 3 with respect to a base group 2 of a seat 1 according to the present invention provides for moving the lever 7 with respect to the lower shell 4 and/or upper shell 5 along the second direction, e.g. by raising the lever 7 with respect to the base group 2 and/or lowering the lever 7 with respect to the top group 3, so as to disengage or release the first removable engagement means, e.g. a projecting or recessed section 7c of the lever 7, from a lowered or protruding portion 4b of the lower shell 4 or upper shell 5.

If desired, if the seat comprises second engagement means, the method also includes a step of sliding of the top group 3 with respect to the base group 2 so as to disengage or release the second removable engagement means, for example at least one sliding section 5a1, 5a2, from respective housing portions 4a.

More particularly, the sliding step is carried out after the first removable engagement means have been disengaged or released.

Advantageously, the step of raising or lowering the lever 7 is carried out by manually acting on the lever 7 or better yet on the grip end 7b, so as to cause the pressing of the (if provided) elastic loading element(s) 8. In such case, the releasing mechanism would be constituted by a manual releasing mechanism.

In order to assemble a top group 3 with a base group 2, however, the top group 3 is moved close to the base group 2 until the first removable engagement means are engaged or constrained, for example by lowering the top group 3 towards the base group 2.

If desired, if the seat comprises second engagement means, then a step of sliding of the top group 3 is first carried out with respect to the base group 2 so as to engage or constrain the second removable engagement means, e.g. at least one sliding section 5a1, 5a2 with respective housing portions 4a.

More particularly, the sliding step is carried out by maintaining a projecting or recessed section 7c of the top group 3 raised and/or a lowered or protruding portion 4b of the base group 2 lowered and, after having carried out the sliding step, the projecting or recessed section 7c and/or the lowered or protruding portion 4b is released. Advantageously, in order to do this, one manually acts on the lever 7 or better yet on the grip end 7b, so as to keep the elastic loading element(s) 8 (if provided) pressed, before then, after having engaged the second engagement means, releasing the lever 7.

As will be understood, a seat 1 according to the present invention allows easily constraining or releasing (e.g. for substituting a piece or for preventing the seat from being stolen) a top group 3 with respect to a base group 2, since it is sufficient to raise one or more levers 7 with respect to a base group 2 and/or lower one or more levers 7 with respect to a top group 3, if desired by also making them slide as stated above.

Additionally, a seat according to the present invention is also simple to make, since it has only a few parts with rather simple geometry.

Modifications and variations of the invention are possible within the protective scope defined by the claims.

Hence, for example, second engagement means might not be provided, but only for example the first engagement means might be provided. In such case, if desired, the seat could comprise a lever or even multiple levers designed to removably engage base group and top group.

In addition, the first constraining means could be such to prevent the sliding of the two groups in front-rear direction, and disengageable or releasable by relatively moving top group and said base group in a direction from one side to the other.

Naturally, one or more levers could also be provided that are constrained or fixed to the upper shell and one or more levers could be provided that are constrained or fixed to the lower shell.

In addition, the first engagement means might only be releasable after the second removable engagement means have been released or disconnected. For such purpose, the first engagement means could comprise pins or the like fixed to the top group or to the upper shell and having a slot or groove, and such pins are insertable to size in respective openings of the lower shell, while the second engagement means can include a lever or the like pivoted around a vertical axis and movable between an open position and a closed position in which it is engaged with the slot of the pins, so that for releasing base group and top group, the lever is first moved from the closed position to the open position and then the first engagement means are disengaged by moving the top group upward.

The invention claimed is:

1. A seat for a vehicle, a bicycle, a stationary bicycle or a motorcycle comprising:
   a base group which can be fixed to a support element or seat post (SP) of a vehicle, a bicycle, a stationary bicycle or a motorcycle, said base group having a lower surface or area and an upper surface or area;
   a top group, said top group having an upper face or zone and a lower face or zone, in use, resting on or facing toward said upper surface or area of said base group, said upper face of said top group defining a supporting surface for a user;
   removable engagement means between said base group and said top group,
   wherein said base group includes a lower shell and said top group comprises an upper shell, said base group and/or said top group comprising at least one releasing mechanism having a constraining or fixing end or portion secured or fixed to said lower shell or to said upper shell and having, in use, a grip end engageable starting from an edge portion of said seat or projecting at an edge portion of said seat and not fixed to said shell to which said constraining end is constrained, and
   wherein said removable engagement means comprise first removable engagement means intended to prevent or hinder the relative displacement of said base group and said top group in a first direction (A-A) lying, in use, on a horizontal or vertical plane, said first removable engagement means being disengageable or releasable by moving said at least one releasing mechanism with respect to said lower shell and/or to said upper shell in a second direction (B-B) transversal or orthogonal to said first direction (A-A).

2. A seat according to claim 1, wherein said first engagement means are intended to prevent or hinder the relative displacement of said base group and said top group in a sliding direction (A-A) lying, in use, on a horizontal plane, said first removable engagement means being disengageable or releasable by raising (B-B) said at least one releasing mechanism with respect to said base group and/or lowering (B-B) said at least one releasing mechanism with respect to said top group.

3. A seat according to claim 1, wherein said engagement means comprise second removable engagement means intended to prevent or hinder the displacement of said top group with respect to said base group in said second direction, said second removable engagement means being disengageable or releasable by moving said top group with respect to said base group in said first direction (A-A).

4. A seat according to claim 3, wherein said second engagement means are intended to prevent or hinder the lowering-lifting (B-B) of said top group with respect to said base group, said second removable engagement means being disengageable or releasable by moving said top group with respect to said base group in said sliding direction (A-A).

5. A seat according to claim 3, wherein said second removable engagement means are releasable or disconnectable after said first engagement means have been released or disconnected, so that for releasing said top group with respect to said base group firstly the displacement of said at least one releasing mechanism is controlled with respect to said lower shell and/or to said upper shell along said second direction (B-B), thus releasing said first removable engagement means and then the displacement of said top group with respect to said base group along said first direction (A-A) is controlled, thus releasing said second removable engagement means.

6. A seat according to claim 3, wherein said second removable engagement means comprise at least one housing portion of said top group or of said base group as well as at least one sliding section of the other between base group or top group slidably engageable along said first direction (A-A) in a respective housing portion.

7. A seat according to claim 1, any one of the preceding claims, comprising a front (F), a rear (R), two sides (S1, S2), a bottom surface corresponding to said upper surface or area of said base group and wherein said sliding direction (A-A) is a direction from the front (F) to the rear (R), comprising at least one of parallel to a main longitudinal axis or length of the seat, or a direction from one side (S1) to the other (S2), or comprising at least one of parallel to a main transverse axis or width of the seat, or a direction inclined with respect to the direction from the front (F) to the rear (R) and to the direction from one side (S1) to the other (S2).

8. A seat according to claim 1, wherein said first removable engagement means comprise at least one projecting or recessed section of said at least one releasing mechanism and at least one lowered or protruding portion of said lower shell, if said at least one releasing mechanism is constrained or fixed to said upper shell, or of said upper shell, if said at least one releasing mechanism is constrained or fixed to said lower shell, said at least one lowered or protruding portion being intended to engage said projecting or recessed section, so that by moving said at least one releasing mechanism along said second direction (B-B) with respect to said lower shell or upper shell including said lowered or protruding portion, said projecting or recessed section is disengaged or released from said lowered or protruding portion.

9. A seat according to claim 8, comprising at least one elastic loading element of said at least one releasing mechanism, said at least one elastic loading element being designed to maintain said at least one releasing mechanism yieldingly spaced from the lower face of said upper shell, if said at least one releasing mechanism is constrained or fixed to said upper shell, or to maintain said at least one releasing mechanism yieldingly spaced from the upper face of said lower shell, if said at least one releasing mechanism is constrained or fixed to said lower shell.

10. A seat according to claim 1, wherein said releasing mechanism comprises at least one lever (7) or handle.

11. A seat according to claim 8, wherein said lower shell comprises a semi-shell element with a base wall and a lateral wall protruding from the perimeter of said base wall and defining at the top an upper edge, a section of said upper edge being said protruding portion of said base group.

12. A seat according to claim 6, wherein said lower shell comprises a semi-shell element with a base wall and a lateral wall protruding from the perimeter of said base wall, and wherein at least one block or box component defining a housing portion or a sliding section extends starting from the internal face, in use, of said base wall and within or at an edge of the zone defined by said base wall with said lateral wall.

13. A seat according to claim 6, wherein said top group comprises an upper shell, said upper shell having a main wall and an edge wall protruding downward, in use, starting from said main wall, and wherein one or more sliding sections or housing portions, each intended to slidably engage a respective housing portion or sliding section of said base group, extend starting from the lower face, in use, of said main wall.

14. A seat according to claim 1, wherein said base group comprises adjusting means for adjusting the seat's inclination with respect to a seat post or to a support element of a vehicle, such as a bicycle, a motorcycle or a stationary bicycle.

15. A method for disassembling a top group with respect to a base group of a seat according to claim 1, comprising a step of relative displacement of said at least one releasing mechanism with respect to said lower shell and/or with respect to said upper shell along said second direction (B-B) so as to disengage or release said first removable engagement means.

16. The method according to claim 15, comprising a step of sliding of said top group with respect to said base group so as to disengage or release said second removable engagement means.

17. The method according to claim 16, wherein said sliding step is carried out after said first removable engagement means have been disengaged or released.

18. The method according to claim 15, wherein said step of displacement of said top group with respect to said base group along said second direction (B-B) is carried out by manually acting on said at least one releasing mechanism.

\* \* \* \* \*